Jan. 19, 1965   D. M. WADE ETAL   3,166,169
ONE-WAY ROLLER CLUTCH WITH PLURAL CAGE MEANS
Filed Dec. 22, 1961   2 Sheets-Sheet 1
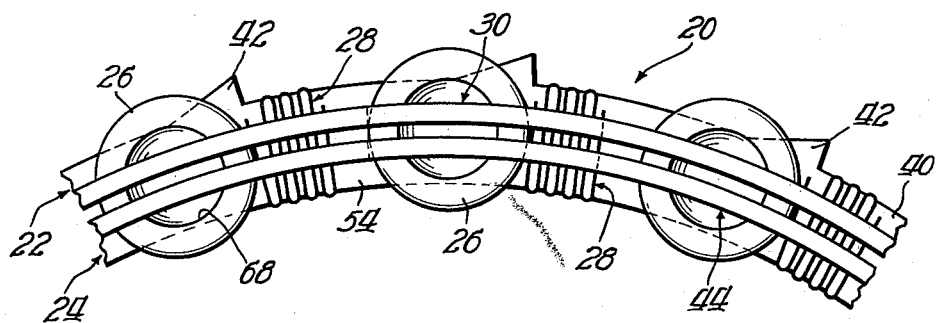
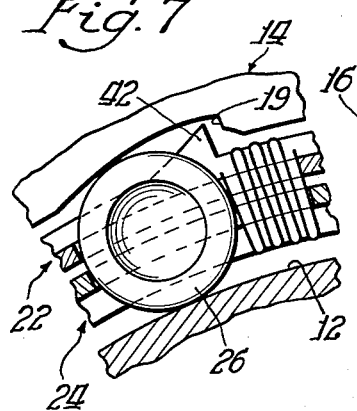
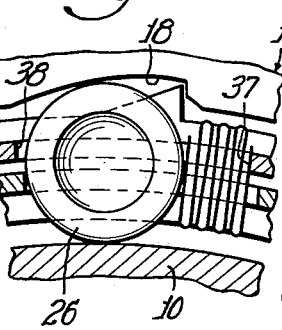
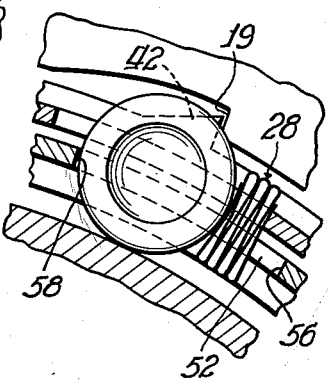
Inventors:
Ernest A. Ferris
and Daniel M. Wade
By: Frank R. Thienpont Atty.

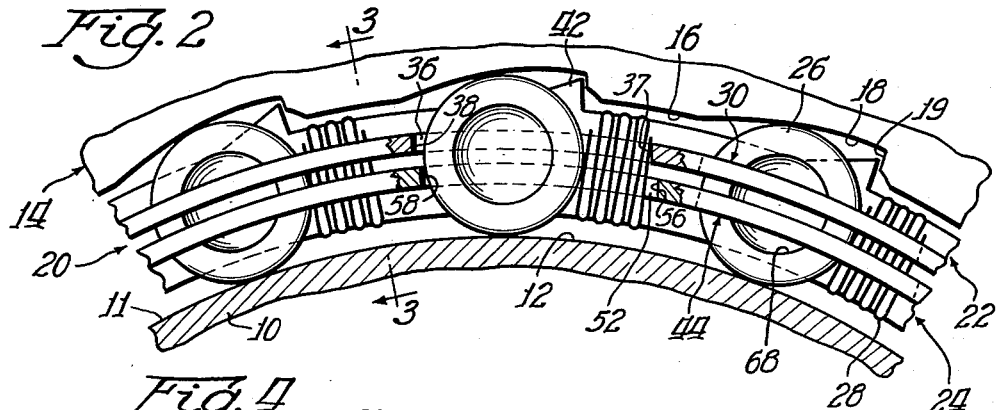
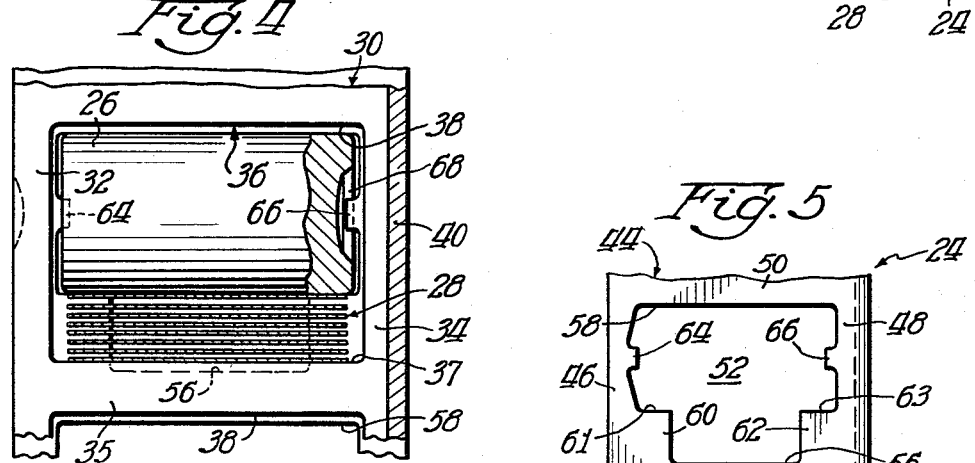
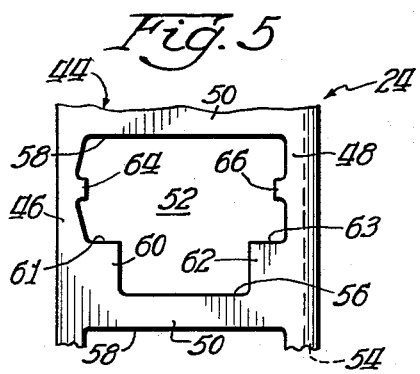
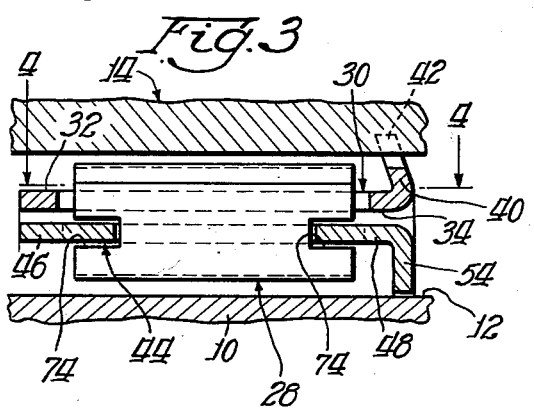
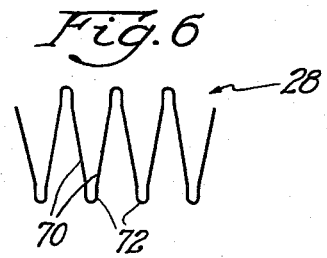

United States Patent Office 3,166,169
Patented Jan. 19, 1965

3,166,169
ONE-WAY ROLLER CLUTCH WITH PLURAL CAGE MEANS
Daniel M. Wade, River Forest, and Ernest A. Ferris, Downers Grove, Ill., assignors to Borg-Warner Corporation, a corporation of Illinois
Filed Dec. 22, 1961, Ser. No. 161,493
7 Claims. (Cl. 192—45)

This invention relates to one-way clutches and more particularly to a one-way clutch of the roller and cam type used to prevent relative rotation between races in one direction while permitting free relative rotation in the opposite direction.

A principal object of the invention is to provide a one-way engaging device of the roller and cam type utilizing a double cage design accomplishing both full-phasing and individual energizing of the rollers.

A further object of this invention is to provide a unitary pre-assembled roller and double cage assembly wherein one cage is adapted to act as a reaction member and the other cage is used as a roller retaining cage and as a support means for the energizing springs and is adapted to act as a roller phasing cage in a complete clutch device.

The above and other objects and advantages of the invention will be more readily apparent when read in connection with the accompanying drawings in which:

FIG. 1 is a partial elevational view of the roller, cage, and spring assembly;

FIG. 2 is an enlarged partial elevational view partially in section of a clutch device showing the unitary roller, cage, and spring assembly positioned between inner and outer races;

FIG. 3 is an enlarged elevational view taken along the line 3—3 of FIG. 2 showing one of the springs positioned on the inner cage member;

FIG. 4 is a view partially in section taken along line 4—4 of FIG. 3;

FIG. 5 is a view of a portion of the inner cage member before the spring is mounted on the member and before the roller is inserted in the cage member;

FIG. 6 is a side view showing one of the energizing springs in expanded form;

FIGS. 7, 8, and 9 are partial views in section illustrating the positions of the rollers, cages, and spring in a high-load position, initial lock position and extreme free-wheel position respectively.

Referring now to the drawings wherein like numerals on different views identify identical parts, the device shown in FIGS. 2 and 3 as partial views comprises a shaft 10 on which there is formed a cylindrical surface 11. On part of the cylindrical surface there is formed an inner race 12. An annular member 14 is concentrically disposed about the shaft 10. An outer race 16 comprising a series of cammed surfaces 18 are formed on the member 14. A unitary pre-assembled roller and double cage assembly 20 is disposed between the members 10 and 14. While the description herein will refer to an overrunning clutch device in which the cammed race is formed on the outer race it will be appreciated that the principles of the invention herein are equally applicable if the cammed race is formed on the inner race.

For purposes of the description herein the shaft 10 may sometimes be referred as the driving member and the annular section 14 as the driven member. The function of the two members, of course, may be reversed. The pre-assembled roller and cage assembly 20 disposed between the inner race 12 and the outer race 16 prevent a relative rotation between the driving and driven members in one direction while permitting relative rotation between the same members in the opposite direction.

The roller and cage assembly 20 comprises a reaction cage member or energizing cage member 22, an inner cage member 24 sometimes referred to as the phasing cage, a plurality of roller wedging elements 26 and a plurality of individual accordion type energizing spring members 28 respectively associated with each of the roller elements and mounted on the phasing cage member. This roller and cage assembly is a pre-assembled unit which may be easily installed as a unit between inner and outer race members.

The reaction member 22 comprises a cylindrical axially extending portion 30 formed with two side bar portions 32 and 34 and a plurality of cross-bar portions 35 interconnecting the side bars to define a series of cage windows or openings 36 through which the roller elements 26 may extend. Numerals 37 and 38 indicate the axially extending edges of the cross-bar portions 35. The cage member 22 is a fairly rigid structure and may be made, for example, of metal approximately .040 inches in thickness. On the side bar 34 there is formed a substantially radially outwardly extending flange 40. The flange 40 has formed thereon a series of substantially saw-tooth like projections 42 which serve as reaction points and are adapted to co-act with the shoulders 19 adjacent the cammed outer race 16.

The inner or phasing cage member 24 comprises a cylindrical axially extending portion 44 on which there are formed two side bar portions 46 and 48 and a plurality of cross-bar portions 50 interconnecting the side bar portions to define a series of cage windows or openings 52 adapted to receive the roller elements 26 and the energizing springs 28. This cage member also is a fairly rigid structure and may be made of the same material as the outer cage member. On the side bar 48 there is formed a radially inwardly extending flange 54 which is effective to maintain the inner cage concentric with respect to the cylindrical race in an assembled clutch unit.

Each of the cross-bar portions 50 of the inner cage member 24 has formed thereon edges 56 and 58. Extending circumferentially from the edge 56 and inwardly from the side bar portions 46 and 48 into the opening 52 are shoulders 60 and 62. Projections 64 and 66 are formed on each of the side bar portions 46 and 48 defining the sides of the cage windows 52. These projections support the roller elements.

The spring elements 28 are of the accordion type and are of substantially the same construction as the spring element described in our co-pending application One-Way Roller Clutch, Serial No. 144,234, filed October 10, 1961. Each of the spring elements 28 comprises a plurality of leaves 70 which are joined at opposite ends to the next adjacent leaf by filleted portions 72. Each of the leaves 70 of the spring 28 has formed at each side thereof notches or slots 74 adapted to receive the shoulder portions 60 and 62 of the inner cage member. In an assembled condition the spring members are slidingly positioned on the shoulder portions 60 and 62 which act in a sense as rails when the spring is compressed and expanded.

The roller elements 26 have formed in each end thereof indentations 68 for receiving the projections 64 and 66 formed on the side bar portions of the inner cage member. The distance between the edge 58 and the edges 61 and 63 is just large enough to provide a clearance for the roller 26 to pass through the opening 52 radially. Once a roller has been positioned in an opening 52 a portion of the side bar 46 adjacent the projection 64 is staked inwardly so that in the final assembly the roller will be positioned in the opening 52 as shown in FIG. 4.

It will be observed in the assembled unit 20 that the compression of the springs 28 is limited by the fact that the circumferential movement of the roller with respect to the inner cage is limited due to its being confined between the edge 58 and the edges 61 and 63 of the shoulders 60 and 62. In addition the radial movement of the springs 28 with respect to the inner cage member is limited by the type of mounting provided for the springs on the inner cage member, that is the slot and shoulder arrangement. Thus, when the unit 20 is eventually placed between two members such as 10 and 14 the spring is protected both against over-compression and radial displacement. In addition it is obvious that the spring is confined against circumferential displacement. It should also be noted that the height of the springs 28 in the most extreme compressed condition is never great enough for the springs to touch either of the races.

*Operation*

Referring now to FIG. 2 it will be apparent that when the shaft 10 is turned in a clockwise direction relative to the member 14 the device will be in an overrunning or free-wheeling condition and the driving and driven members will not rotate as a unit. On the other hand if an attempt is made to rotate the shaft 10 in a counter-clockwise direction relative to the member 14 the driving and driven members will rotate as a unit. In FIGS. 7–9 relative positions of each of the roller and cage assembly with respect to the races are illustrated for three positions. FIG. 7 shows a high-load position. FIG. 8 shows an initial lock position. FIG. 9 shows extreme overrunning or free-wheel position. In the extreme free-wheel position, that is, when the member 14 rotates counterclockwise relative to the member 10, it will be noted that the spring 28 is in an extreme compressed position. The relative position between the roller confined in the opening 52 of the inner or phasing cage, the projections 42 on the reaction cage member 22 and the shoulders 19 on the cammed race is such as to limit the compression that may be exerted on the springs 28.

As the device tends to move from a free-wheel position of FIG. 9 to the initial lock position of FIG. 8 the outer member 14 moves relatively clockwise to the inner member 10. As this happens, the compressive force on the springs 28 is lessened thus permitting them to urge the rollers 26 up the ramps 16. Since the rollers are phased by the inner cage member, the latter tends to move counterclockwise with respect to the outer cage member until an initial lock position is reached. The total spring force tending to urge the rollers into engagement in lock position is substantially equal to the force of each spring multiplied by the number of springs. Because the phasing action of the inner cage member is effective to make the rollers move simultaneously the total force of the spring action is fairly well distributed over all the rollers. This phasing action also makes it possible for all the rollers to assume or release their load substantially simultaneously. As the rollers 26 tend to move further up the ramp 16 the inner cage member rotates even more in a counterclockwise direction relative to the outer cage member and the springs 28 eventually reach their maximum expansion as illustrated in the high-load position of FIG. 7. It will be noted that in the high-load position the outer cage member has moved away from contact with the outer member 14 so that the reaction points 42 of the outer cage member are no longer in contact with the shoulders 19 on the outer cammed race.

In going through these various stages from an extreme free-wheel position to a high-load position the important feature of the phasing of the rollers enabling them to assume substantially equal loads at substantially the same time is accomplished by the positioning of the rollers 26 in the openings 52 of the inner cage member.

These devices sometimes operate at extremely high speeds. A variety of factors may occur, such, for example, as foreign matter getting into the clutch which might have a tendency to pop the roller wedging elements out of position. Because of the unique construction of this device, that is, the phasing of the rollers and the type of mounting of the spring device associated with each roller, it has been observed that the sometimes fatal results of pop-out actions are avoided.

In releasing the load the device goes through substantially the same stages as previously described in a reverse order.

It will thus be observed that we have advantageously provided in an overrunning clutch device a unitary preassembled roller clutch unit which provides both full-phasing of the rollers and individual energization of each of the rollers in the clutch device.

While a preferred embodiment of the invention has been specifically disclosed it is understood that the invention is not limited thereto as many variations will be apparent to those skilled in the art, and the invention is to be given its broadest possible interpretation within the terms of the following claims.

We claim:

1. A one-way engaging device of the roller and cam type comprising: inner and outer race members, one of said members being a cammed race member; a plurality of roller elements positioned between said members to effect locking engagement of said members in one direction of relative rotation of said members; a first cage member disposed between said race members for supporting said roller elements and for synchronizing the circumferential movement of the roller elements; individual spring means disposed in said cage member adjacent each of said roller elements for urging said roller elements into engagement with said races; coacting means on said first cage member and said spring means for supporting said spring means and preventing contact of said spring means with either of said races; and a reaction cage member disposed in radial spaced relationship to said cage member to provide a reaction point for each of said spring means.

2. A one-way engaging device of the roller and cam type comprising: inner and outer race members, one of said members being a cammed race member; a plurality of roller elements positioned between said members to effect locking engagement of said members in one direction of relative rotation of said members; a first cage member disposed between said race members for supporting said roller elements and for synchronizing the circumferential movement of the roller elements; individual spring means disposed in said cage member adjacent each of roller elements for urging said roller elements into engagement with said races; means defining slots in the sides of each of said spring means for receiving portions of said cage member so that said cage member slidingly supports said spring means; and a reaction cage member disposed in radial spaced relationship to said cage member to provide a reaction point for each of said spring means, said reaction cage member having openings therein through which the rollers and spring means extend.

3. In a unitary cage and gripper assembly for use between two substantially concentrically disposed relatively rotatable members respectively having race surfaces formed thereon the combination comprising: a first axially extending cage member, said cage member comprising two side bars and interconnecting cross bars defining openings in said cage member for receiving roller wedging elements; a plurality of roller wedging elements mounted in said first cage member; a second axially extending cage member radially spaced from said first cage member, means defining openings in said second cage member for receiving said roller elements; a plurality of accordion type spring means associated respectively with each of said wedging elements, said springs being mounted on said first cage member and extending through both first and second cage members, means defining a slot formed at each side of said spring means for receiving the side bars of said first cage member, said second cage member being adapted to function as a reaction member for said spring means and said first cage member being adapted to function as a phasing member for the rollers to provide substantially synchronous circumferential movement of the rollers when the assembly is positioned between the relatively rotatable members.

4. In a unitary cage and gripper assembly for use between two substantially concentrically disposed relatively rotatable members respectively having race surfaces formed thereon the combination comprising: an inner cage member comprising two side bars and interconnecting cross bars defining openings in said cage member for receiving roller wedging elements; a plurality of roller wedging elements secured in said inner cage member; an outer cage member substantially concentrically disposed around and radially spaced from said inner cage member; means defining openings in said outer cage member for receiving said roller elements; a plurality of accordion type spring means mounted on said inner cage member and extending through both inner and outer cage members; means defining a slot formed at each side of said spring means for receiving portions of the side bars of said inner cage member; said outer cage member being adapted to function as a reaction member for said spring means and said inner cage being adapted to function as a phasing member for the rollers to provide substantially synchronous circumferential movement of the rollers when the assembly is positioned between the relatively rotatable members.

5. In a one-way engaging device of the roller and cam type having outer and inner race members, one of said members having a plurality of cammed surfaces formed thereon, a plurality of roller wedging elements disposed between said outer and inner race members, a cage means for supporting said rollers in spaced relation between said race members and spring energizing means for energizing the rollers, the combination comprising: a unitary preassembled clutch unit comprising a first cage member for supporting said rollers and said spring means, said cage member being constructed to provide substantially synchronous circumferential movement of the rollers between said race members; and a ring reaction member disposed in concentric spaced relation to said first cage member to coact with said cammed race member to provide a reaction point for said energizing springs.

6. The device of claim 5 wherein each of the springs have slots formed on their sides for receiving portions of the first cage member so that the springs are slidably supported on said cage member.

7. In a unitary cage and gripper assembly for use between two substantially concentrically disposed relatively rotatable members respectively having race surfaces formed thereon the combination comprising: a first axially extending cage member, said cage member comprising two side bars and interconnecting cross bars defining openings in said cage member for receiving roller wedging elements; a plurality of roller wedging elements mounted in said first cage member; a second axially extending cage member radially spaced from said first cage member; means defining openings in said second cage member for receiving said roller elements; a plurality of accordion type spring means associated respectively with each of said wedging elements, said springs being mounted on said first cage member and extending through both first and second cage members, means being provided by said spring means for receiving said first cage member, said second cage member being adapted to function as a reaction member for said spring means and said first cage member being adapted to function as a phasing member for the rollers to provide substantially synchronous circumferential movement of the rollers when the assembly is positioned between the relatively rotatable members.

References Cited in the file of this patent

UNITED STATES PATENTS

| | | |
|---|---|---|
| 2,363,785 | Gold | Nov. 28, 1944 |
| 2,532,981 | Wolfe | Dec. 5, 1950 |
| 2,743,803 | Ferris | May 1, 1956 |
| 2,753,027 | Troendly et al. | July 3, 1956 |
| 2,824,636 | Troendly et al. | Feb. 25, 1958 |
| 2,837,188 | Cobb | June 3, 1958 |
| 2,843,238 | Rozner | July 15, 1958 |
| 3,011,606 | Ferris et al. | Dec. 5, 1961 |
| 3,031,052 | Blinder | Apr. 24, 1962 |
| 3,087,588 | Fischer | Apr. 30, 1963 |